US 12,071,174 B2

(12) United States Patent
Suzuki et al.

(10) Patent No.: US 12,071,174 B2
(45) Date of Patent: Aug. 27, 2024

(54) SUBFRAME

(71) Applicant: NIPPON STEEL CORPORATION, Tokyo (JP)

(72) Inventors: Junichiro Suzuki, Tokyo (JP); Yohei Kato, Tokyo (JP); Susumu Yuasa, Tokyo (JP); Yui Takahashi, Tokyo (JP); Daisuke Yasufuku, Tokyo (JP); Hiroshi Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/023,569

(22) PCT Filed: Aug. 31, 2021

(86) PCT No.: PCT/JP2021/031824
§ 371 (c)(1),
(2) Date: Feb. 27, 2023

(87) PCT Pub. No.: WO2022/050244
PCT Pub. Date: Mar. 10, 2022

(65) Prior Publication Data
US 2023/0311993 A1  Oct. 5, 2023

(30) Foreign Application Priority Data

Sep. 1, 2020  (JP) .................. 2020-146523

(51) Int. Cl.
*B62D 21/11*  (2006.01)
(52) U.S. Cl.
CPC .................... *B62D 21/11* (2013.01)

(58) Field of Classification Search
CPC ............................ B62D 21/11; B60G 2206/60
See application file for complete search history.

(56) References Cited

U.S. PATENT DOCUMENTS

2001/0020774 A1* 9/2001 Suzuki .................. B62D 21/11
280/124.1
2012/0187724 A1* 7/2012 Tomozawa ............. B62D 21/11
296/193.09

(Continued)

FOREIGN PATENT DOCUMENTS

JP       2017-114422 A       6/2017

*Primary Examiner* — James A English
(74) *Attorney, Agent, or Firm* — Birch, Stewart, Kolasch & Birch, LLP (57) ABSTRACT

A subframe (100) includes a base member (110) and a first member (121). The base member (110) is a channel-shaped member that includes a base surface portion (111) and two wall portions (112) on both sides of the base surface portion (111) in a vehicle length direction and is open on its lower side in a vehicle height direction. The first member (121) includes a bottom wall portion (121g), a top wall portion (121t), and a side wall portion (121s). The bottom wall portion (121g) and the top wall portion (121t) are disposed in the same direction as the base surface portion (111). The top wall portion (121t) is overlapped on and joined to the base surface portion (111). The wall portions (112) and the bottom wall portion (121g) form the channel shape. The side wall portion (121s) is a wall that blocks a vehicle width direction between the bottom wall portion (121g) and the top wall portion (121t). A first lower arm support portion (131) is formed by the base surface portion (111) and the bottom wall portion (121g).

9 Claims, 8 Drawing Sheets (56) References Cited

U.S. PATENT DOCUMENTS

| | | | |
|---|---|---|---|
| 2012/0319389 A1* | 12/2012 | Takahashi | B62D 21/11 |
| | | | 280/781 |
| 2016/0347367 A1* | 12/2016 | Yokota | B62D 21/08 |
| 2020/0102014 A1* | 4/2020 | Sakai | B62D 21/07 |
| 2020/0239077 A1* | 7/2020 | Haselhorst | B62D 21/155 |

* cited by examiner

SUBFRAME

TECHNICAL FIELD

The present invention relates to a subframe.
Priority is claimed on Japanese Patent Application No. 2020-146523, filed Sep. 1, 2020, the content of which is incorporated herein by reference.

BACKGROUND ART

Conventionally, there is a subframe attached to a main frame of a vehicle body to support a lower arm.
However, the conventional subframe has room for improvement in weight reduction and performance of a lower arm support portion.

CITATION LIST

Patent Document

[Patent Document 1]
Japanese Unexamined Patent Application, First Publication No. 2017-114422

SUMMARY OF THE INVENTION

Problems to be Solved by the Invention

In view of the problems of the background art described above, an object of the present invention is to provide a subframe that achieves both a weight reduction and an improvement of performance of a lower arm support portion.

Means for Solving the Problem

The gist of the present invention is as follows.
(1) A subframe according to an aspect of the present invention includes a base member and a first member, the base member is a channel-shaped member that includes a base surface portion and two wall portions on both sides of the base surface portion in a vehicle length direction and is open on its lower side in a vehicle height direction, the first member includes a bottom wall portion, a top wall portion, and a side wall portion, the bottom wall portion and the top wall portion are disposed in the same direction as the base surface portion, the top wall portion is overlapped on and joined to the base surface portion, the wall portions and the bottom wall portion form the channel shape, the side wall portion is a wall that blocks a vehicle width direction between the bottom wall portion and the top wall portion, and a first lower arm support portion is formed by the base surface portion and the bottom wall portion.
(2) In the above (1), a bracket may be provided, the bracket may include a second member and a third member, and the second member may include a first body attaching portion at its top portion and be joined to the bottom wall portion, the side wall portion, and the base surface portion.
(3) In the above (2), a second lower arm support portion may be formed by the wall portions and the second member.
(4) In the above (2) or (3), the top wall portion and the second member may be overlapped on and joined to each other.
(5) In any of the above (2) to (4), the base surface portion and the second member may be overlapped on and joined to each other.
(6) In any of the above (1) to (5), the first member may include a second lower arm support wall, and the second lower arm support wall may be adjacent to the side wall portion and be overlapped on and joined to the wall portions.
(7) In any of the above (1) to (6), the base member may include a second body attaching portion oriented in the same direction as the base surface portion at an end portion of the base member in the vehicle width direction from the side wall portion.
(8) In any of the above (1) to (7), the top wall portion may be overlapped on and joined to the base surface portion.
(9) In any one of the above (1) to (8), inward flanges that are adjacent to the wall portions and face the base surface portion may be provided.

Effects of the Invention

According to the present invention, it is possible to provide a subframe that achieves both weight reduction and performance of a lower arm support portion.

EMBODIMENTS OF THE INVENTION

Conventionally, there is a subframe (also called a suspension member) that is a member attached to a main frame of a vehicle body and supports a lower arm of a suspension.
In order to ensure desired rigidity, the subframe may have a hollow structure in which a closed space is formed between a pair of steel plate members having substantially the same size, and of which a cross-section perpendicular to a vehicle width direction is defined as a closed cross-section.
However, since the subframe of such a structure has a structure in which the pair of steel plate members (a base member and a closing plate below the base member) having substantially the same size are made to face each other and integrated by integrally welding them to each other, especially their periphery, it had room for improvement in both weight reduction and performance of a lower arm support portion. Thus, the present inventors have reviewed the structure of the subframe and have found a subframe that can achieve both weight reduction and performance of a lower arm support portion.

A subframe according to the present invention includes a base member and a first member. The base member is a channel-shaped member that includes a base surface portion and two wall portions on both sides of the base surface portion in a vehicle length direction and is open on its lower side in a vehicle height direction. The first member includes a bottom wall portion, a top wall portion, and a side wall portion. The bottom wall portion and the top wall portion are disposed in the same direction as the base surface portion. The top wall portion is overlapped on and joined to the base surface portion. The wall portion and the bottom wall portion form the channel shape. The side wall portion is a wall that blocks a vehicle width direction between the bottom wall portion and the top wall portion. A first lower arm support portion is formed by the base surface portion and the bottom wall portion. Thus, since there is no closing plate over the entire width in the vehicle width direction, the subframe can be lightened. Also, since the side wall portion is provided adjacent to the lower arm support portion (first lower arm support portion), and the side wall portion is fixed to the base member via the top wall portion, the lower arm support portion (first lower arm support portion) is less likely to be deformed. In addition, since the side wall portion restrains the base member and the bottom wall portion, an end portion of the subframe in the vehicle width direction is less likely to be deformed. Accordingly, both weight reduction of the subframe and performance of the lower arm support portion (first lower arm support portion) can be achieved.

An embodiment of the present invention will be described below.

Embodiment

A subframe 100 according to an embodiment will be described.

Figure 1:
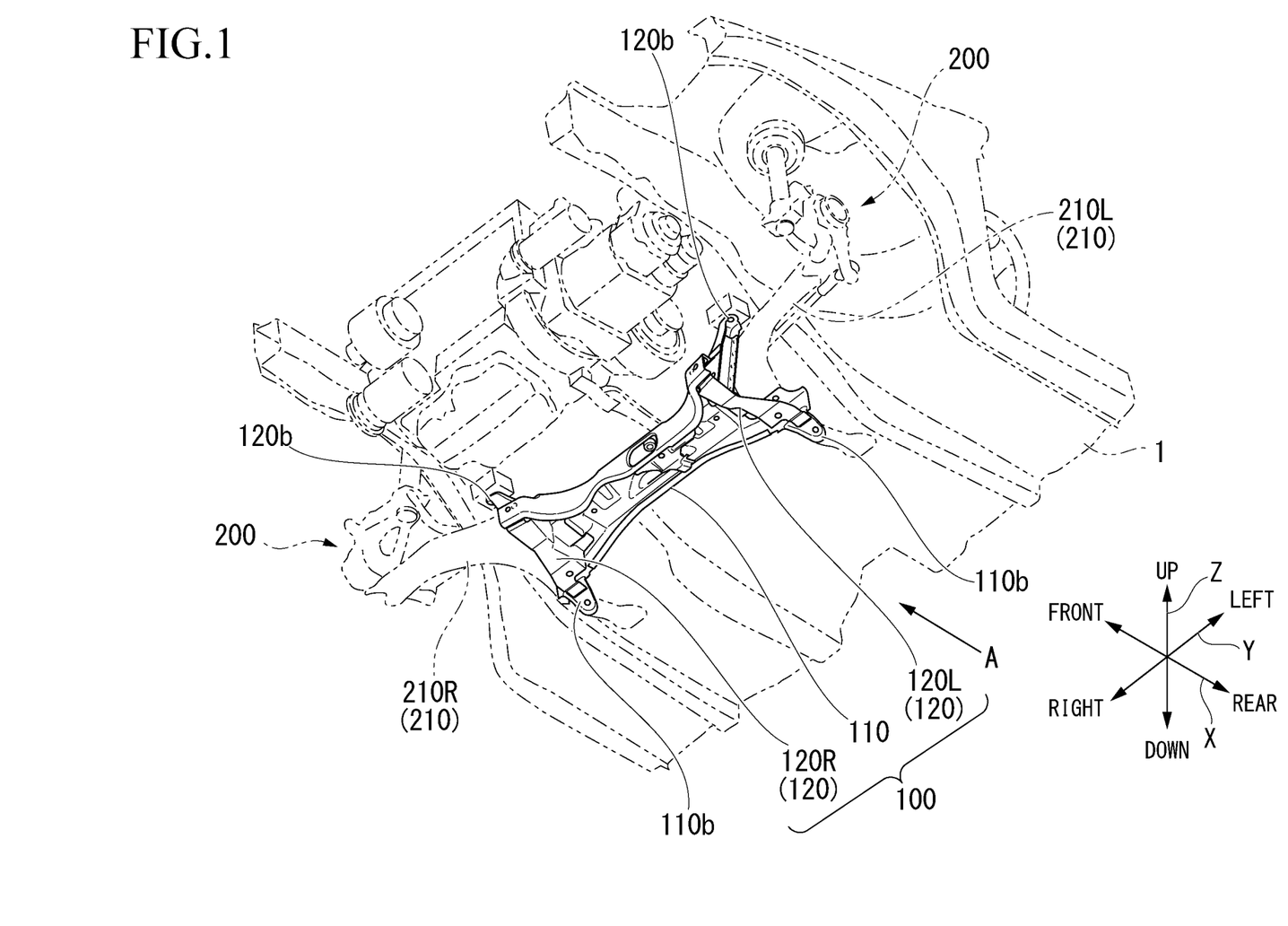
FIG. 1 is a perspective view of a part of a vehicle body including a subframe from below.
Figure 2:
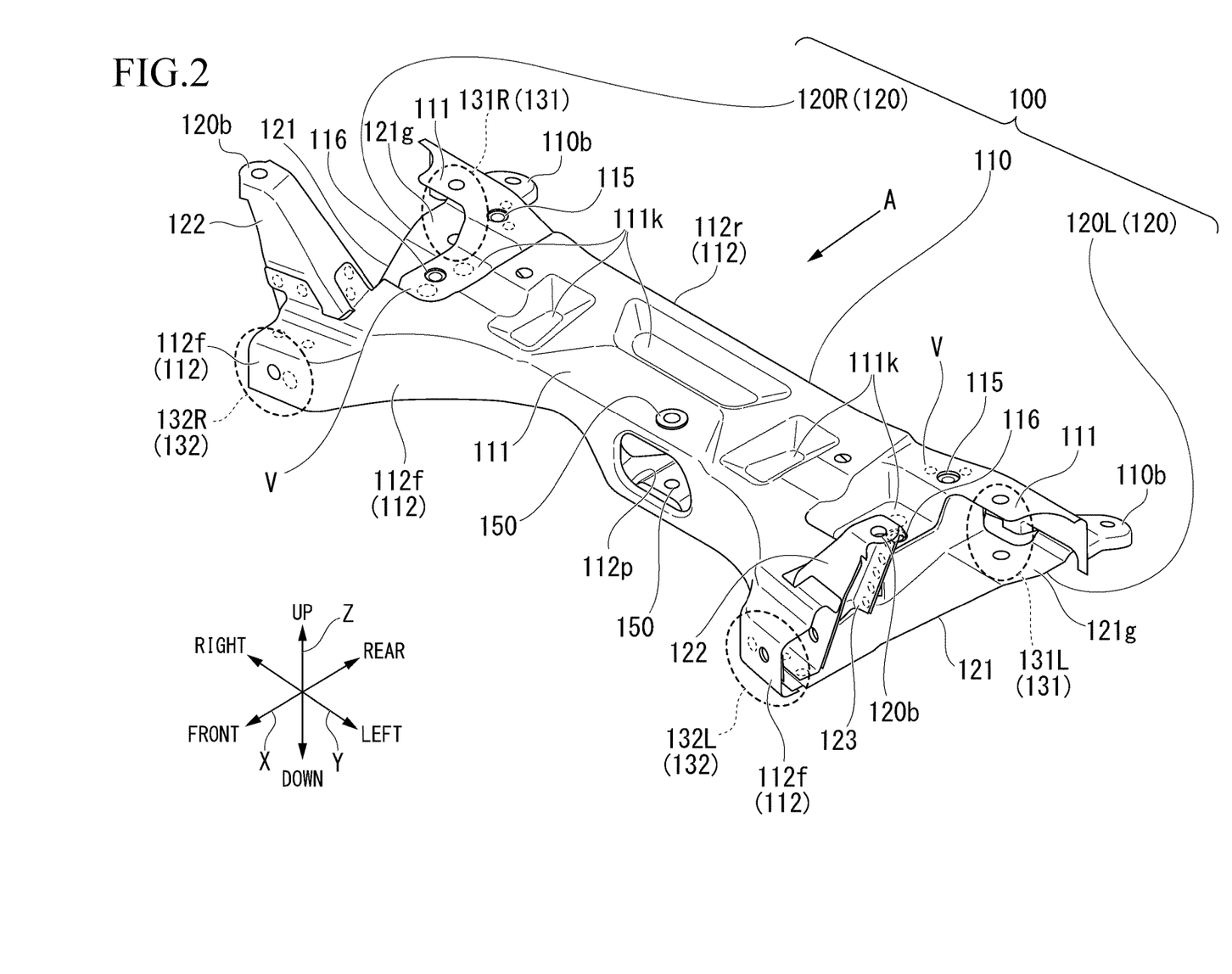
FIG. 2 is a perspective view of the subframe from above.
Figure 3:
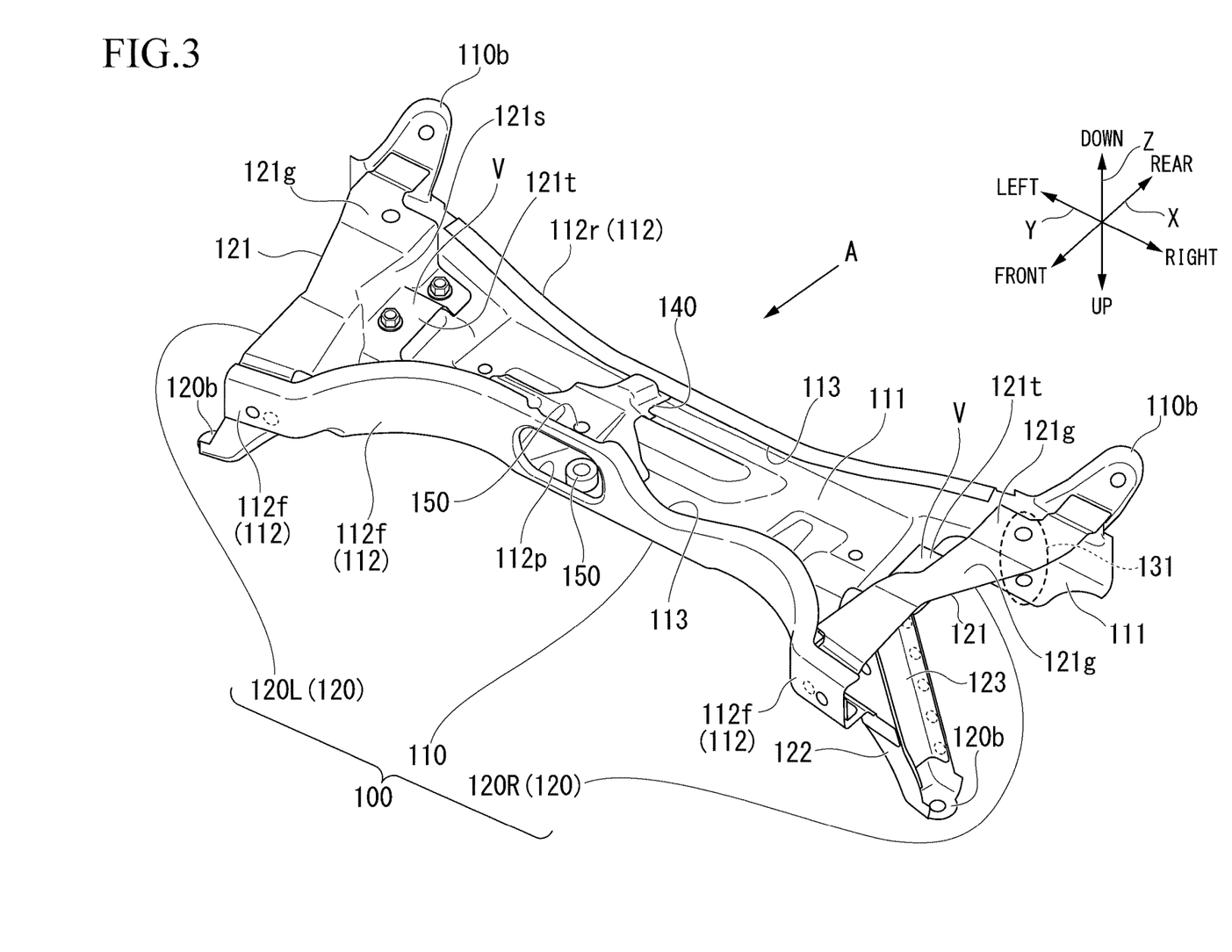
FIG. 3 is a perspective view of the subframe from below.
Figure 4:
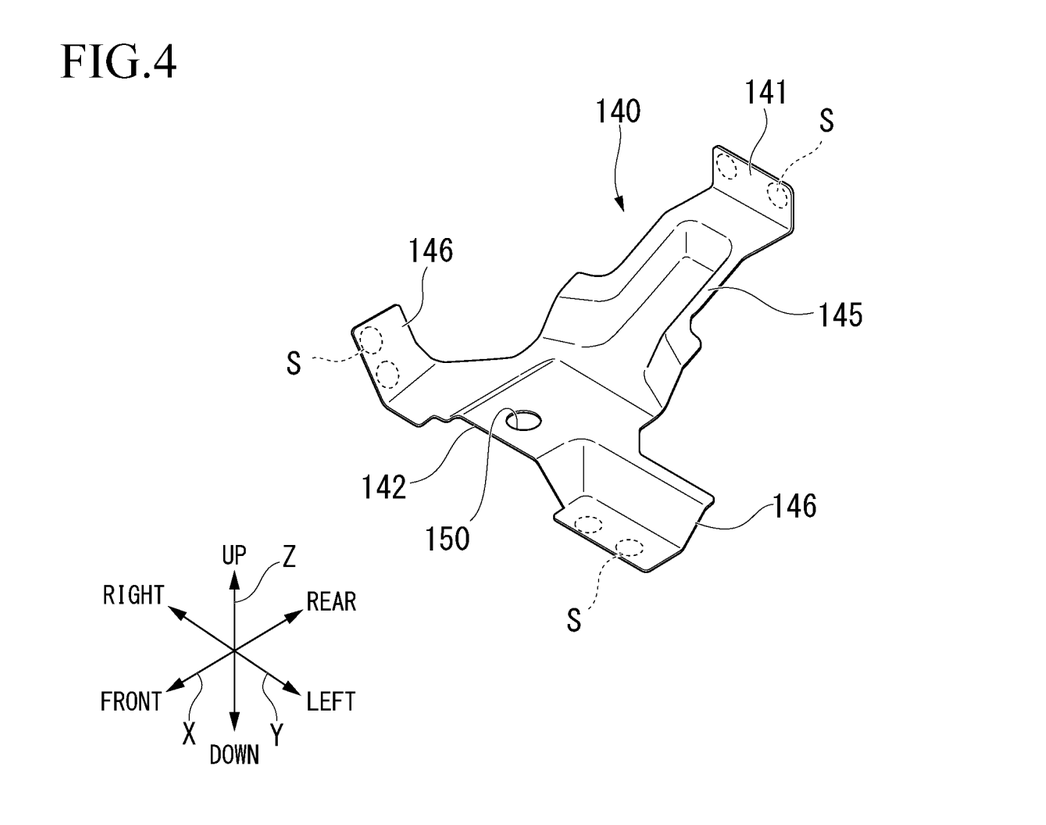
FIG. 4 is a perspective view of a torque rod support bracket.
Figure 5:
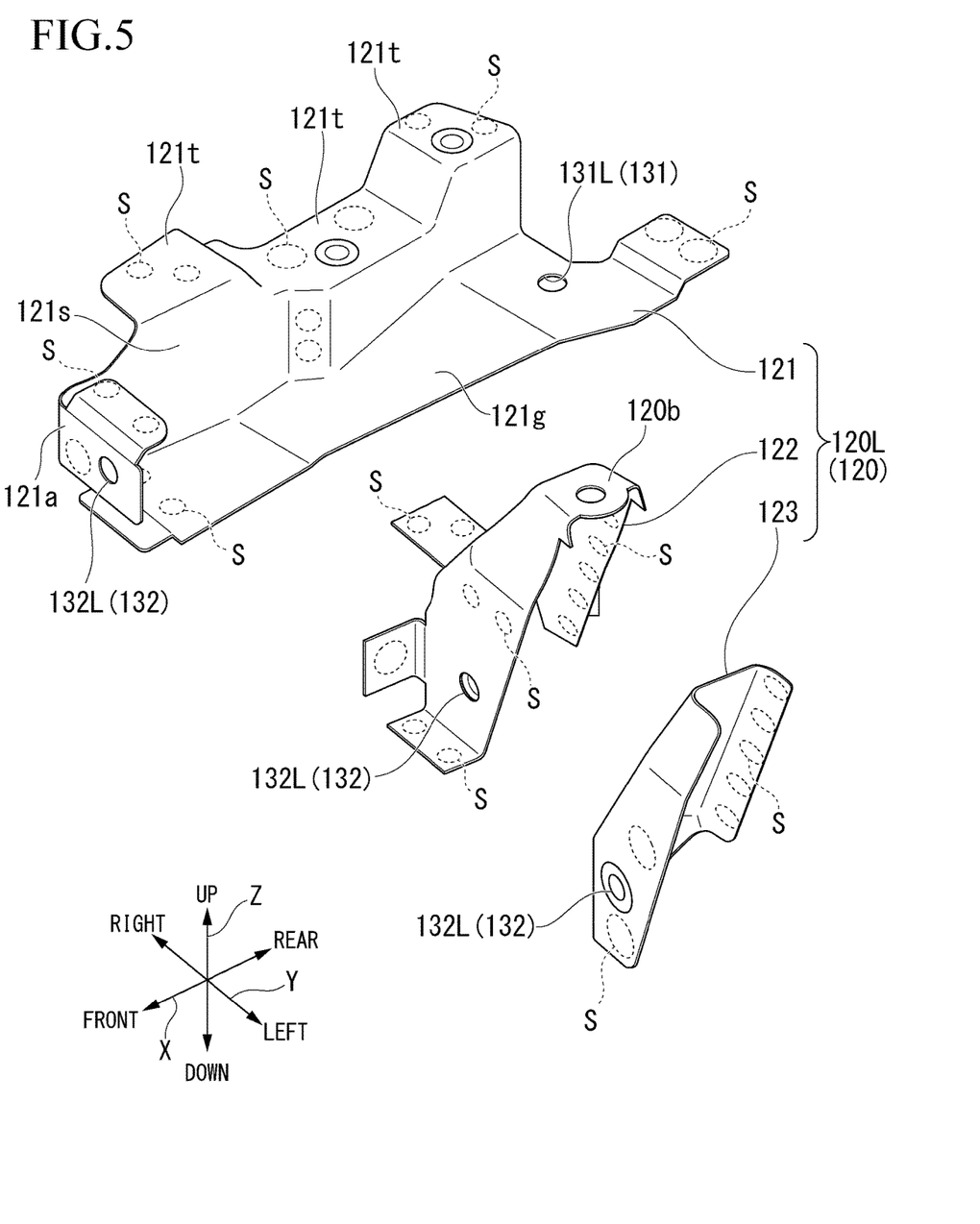
FIG. 5 is an exploded perspective view of a bracket.
Figure 6:
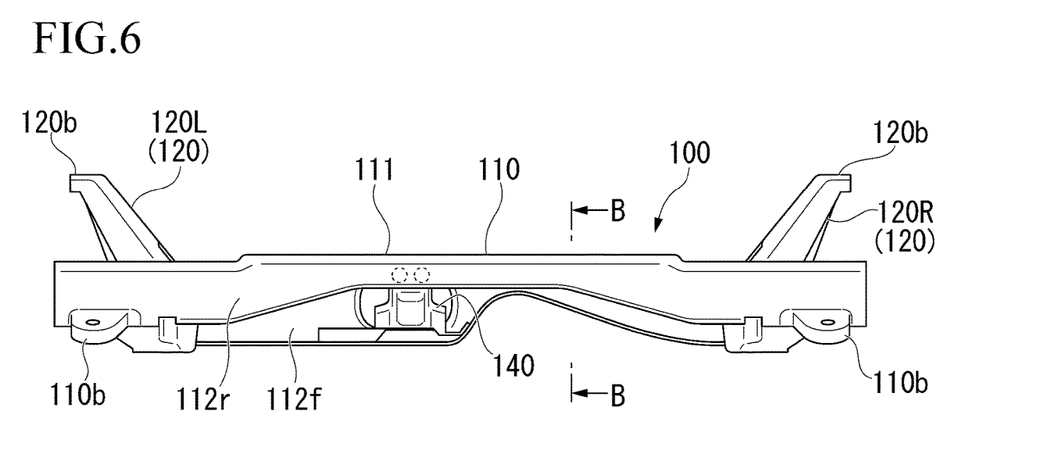
FIG. 6 is a view from the arrow A in FIGS. 1 to 3, which is a front view of the subframe.
Figure 7:
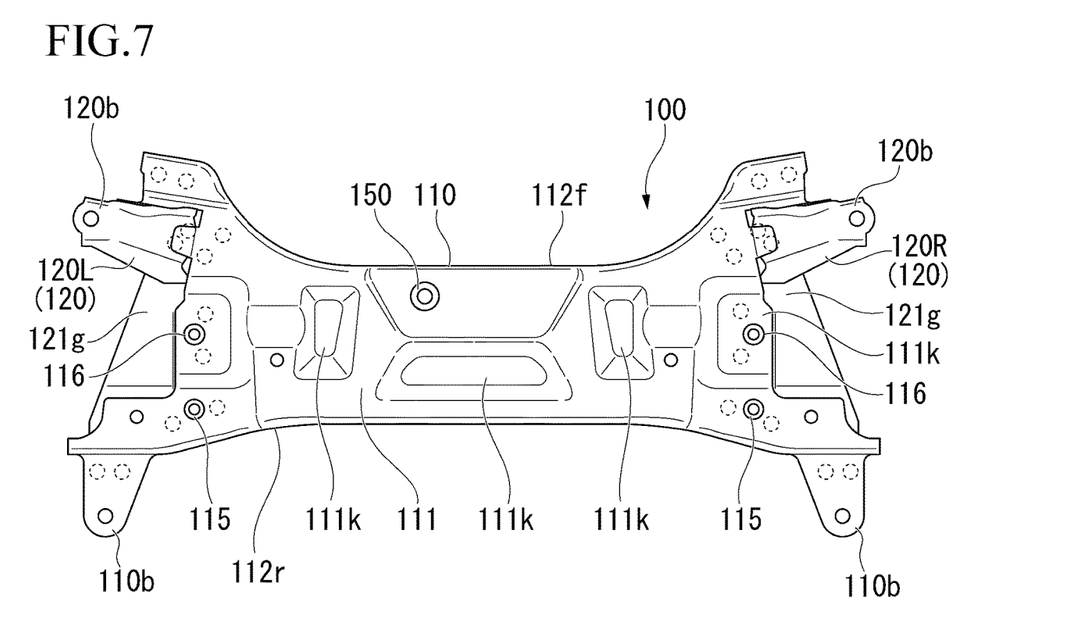
FIG. 7 is a plan view of the subframe.
Figure 8:
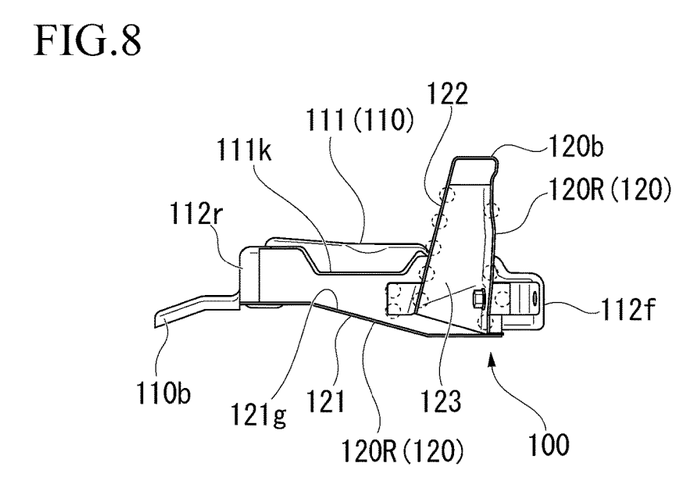
FIG. 8 is a side view of the subframe.
Figure 9:
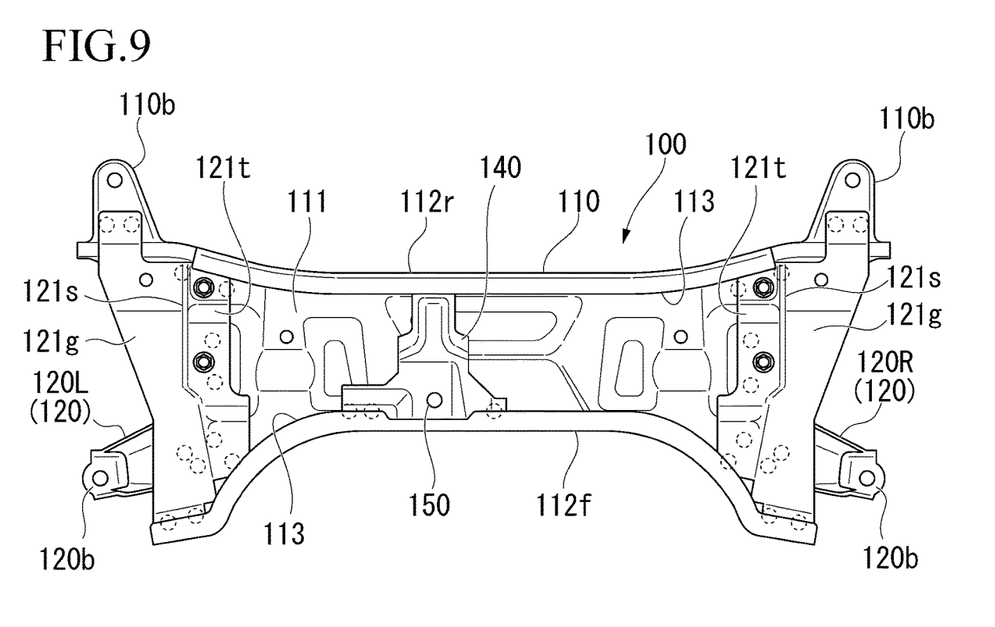
FIG. 9 is a bottom view of the subframe.
Figure 10:
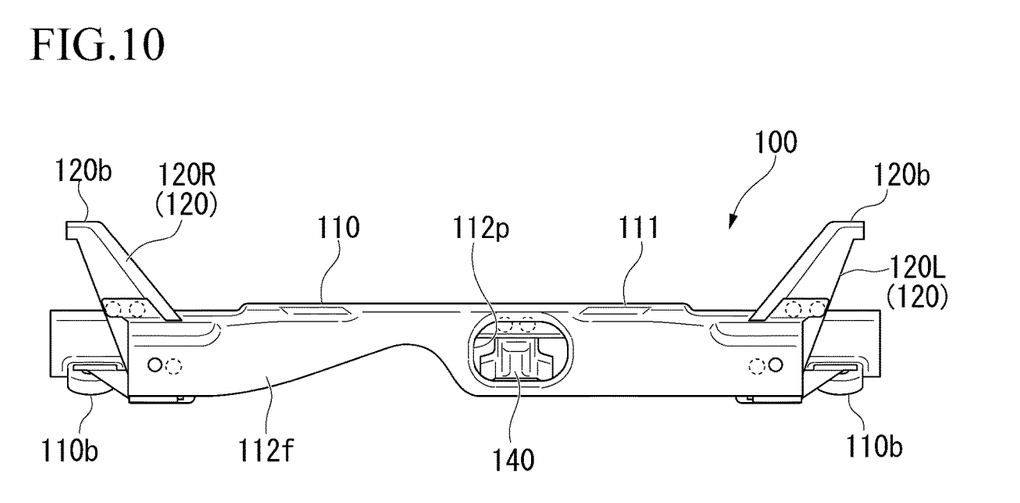
FIG. 10 is a rear view of the subframe.
Figure 11:
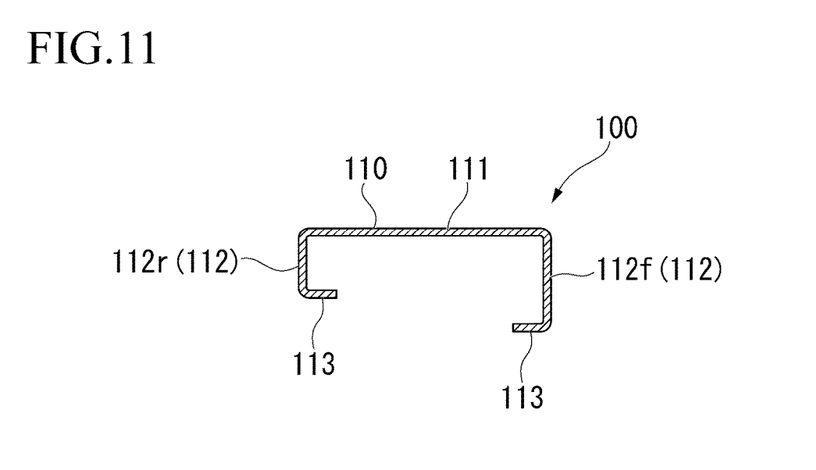
FIG. 11 is a view from the arrow B in FIG. 6.

FIG. 1 is a perspective view of a part of a vehicle body 1 including the subframe 100 from below. FIG. 2 is a perspective view of the subframe 100 from above. FIG. 3 is a perspective view of the subframe 100 from below. FIG. 4 is a perspective view of a torque rod support bracket 140. FIG. 5 is an exploded perspective view of a bracket 120. FIG. 6 is a view from the arrow A in FIGS. 1 to 3, which is a front view of the subframe 100. FIG. 7 is a plan view of the subframe 100. FIG. 8 is a side view of the subframe 100. FIG. 9 is a bottom view of the subframe 100. FIG. 10 is a rear view of the subframe 100. FIG. 11 is a view from the arrow B in FIG. 6.

Hereinafter, the vehicle length direction of the vehicle body 1 may be referred to as an X direction, the vehicle width direction of the vehicle body 1 may be referred to as a Y direction, and the vehicle height direction of the vehicle body 1 may be referred to as a Z direction.

(Subframe)

The subframe 100 will be explained.

The subframe 100 is a member attached to the vehicle body 1 including a mainframe. As shown in FIGS. 1 to 3 and 6 to 11, in a state in which the subframe 100 is attached to the vehicle body 1, it has a flat shape that is shorter in the Z direction than in the X direction when viewed in the vehicle width direction (Y direction), and has an elongated shape that is longer in the Y direction than in the X direction when viewed in a vertical direction (Z direction).

The subframe 100 may generally have a line-symmetrical shape in the vehicle width direction (with an axis of symmetry in the X direction serving as a center).

The subframe 100 is a member that supports lower arms 210. The subframe 100 supports the lower arms 210 that include a left lower arm 210L and a right lower arm 210R with first lower arm support portions 131 (and/or second lower arm support portions 132). The subframe 100 supports the left lower arm 210L with left lower arm support portions 131L and 132L and supports the right lower arm 210R with right lower arm support portions 131R and 132R. The subframe 100 rotatably supports the lower arms 210 with a predetermined degree of freedom via bearings (not shown). Also, the lower arms 210 are components that constitute suspensions 200 that are devices for suspending the vehicle body on wheels.

The subframe 100 includes a base member 110 that extends in the vehicle width direction of the vehicle body 1 and has an opened cross-section, and brackets 120 joined to the base member 110.

The brackets 120 have a left bracket 120L that supports the left lower arm 210L and a right bracket 120R that supports the right lower arm 210R.

Here, the subframe 100 includes the base member 110 and first members 121.

As shown in FIGS. 2 and 3, the base member 110 includes a base surface portion 111 and two wall portions 112 (a second wall portion 112f and a first wall portion 112r) on both sides of the base surface portion 111 in the vehicle length direction. The base member 110 is a channel-shaped member that is open on its lower side in the vehicle height direction.

As shown in FIG. 5, the first members 121 includes a bottom wall portion 121g, a top wall portion 121t, and a side wall portion 121s. The bottom wall portion 121g and the top wall portion 121t are disposed in the same direction as the base surface portion 111.

When viewed in the vehicle length direction, the top wall portion 121t and the bottom wall portion 121g of the first member 121 are disposed outward from the side wall portion 121s in the vehicle width direction and face each other.

The top wall portion 121t is overlapped on and joined to the base surface portion 111. The wall portions 112 and the bottom wall portion 121g form the channel shape. The side wall portion 121s is a wall that blocks the vehicle width direction between the bottom wall portion 121g and the top wall portion 121t. The first lower arm support portion 131 is formed by the base surface portion 111 and the bottom wall portion 121g.

Thus, since there is no closing plate over the entire width in the vehicle width direction, the subframe 100 can be lightened. Further, since the side wall portion 121s is provided adjacent to the first lower arm support portion 131, and the side wall portion 121s is fixed to the base member 110 via the top wall portion 121t, the first lower arm support portion 131 is less likely to be deformed. In addition, since the side wall portion 121s restrains the base member 110 and the bottom wall portion 121g, an end portion of the subframe 100 in the vehicle width direction is less likely to be deformed. Accordingly, both weight reduction of the subframe 100 and the performance of the lower arm support portion (first lower arm support portion 131) can be achieved.

Also, the left bracket 120L and the right bracket 120R are separated from each other. Thus, regions at which the base member 110 and the brackets 120 are joined together can be concentrated in two regions of a region at which the base member 110 and the left bracket 120L are joined together, and a region at which the base member 110 and the right bracket 120R are joined together. In addition, in a region in which the brackets 120 are not present in positions facing the base member 110, that is, in a space formed between the left bracket 120L and the right bracket 120R, an object to be welded and integrated with respect to the base member 110 can be eliminated. That is, regions at which the base member 110, the left bracket 120L, and the right bracket 120R are joined together by welding (an amount of welding) can be reduced. Accordingly, a weight and a manufacturing cost associated with the welding can be reduced. In addition, since joining portions in which the base member 110, the left bracket 120L and the right bracket 120R are joined together by welding can be structured to secure bearing surfaces required for spot welding, the joining portions can be joined by spot welding rather than arc welding.

The subframe 100 has second body attaching portions 110b or first body attaching portions 120b respectively in the base member 110 and the brackets 120. In addition, the subframe 100 is attached to the vehicle body 1 via the second body attaching portions 110b or the first body attaching portions 120b. In the present embodiment, a total of four locations including two locations of the second body attaching portions 110b in the base member 110 and two locations of the first body attaching portions 120b in the brackets 120 are attached to the vehicle body 1.

The base member 110 may include the second body attaching portions 110b oriented in the same direction as the base surface portion 111 at end portions of the base member 110 in the vehicle width direction from the side wall portion 121s.

In this way, since the end portions of the base member 110 in the vehicle width direction are less likely to be deformed due to the side wall portions 121s of the first members 121, rigidity of the second body attaching portions 110b provided at the end portions in the vehicle width direction can be improved.

The base member 110 and the brackets 120 have overlapping connecting portions V joined to each other in a state in which they partially overlap each other. The joining at the overlapping connecting portions V is preferably made by both welding joining and fastening joining such as bolts, but either one may be used. Thus, in particular, rigidity and strength of the overlapping connecting portions V can be increased. In addition, in the subframe 100, by joining the base member 110 and the brackets 120 only at the overlapping connecting portions V, the rigidity and strength of the subframe 100 can be ensured. Accordingly, the amount of welding can be inhibited. Thus, the weight and the manufacturing cost associated with the welding can be reduced.

Further, since the seat surfaces required for spot welding can be secured in the overlapping connecting portions V, they can be joined by spot welding instead of arc welding. Accordingly, the weight and manufacturing cost associated with the welding can be further reduced.

Positions of the overlapping connecting portions V are preferably positions at which distances to the first lower arm support portions 131 (or the second lower arm support portions 132), the second body attaching portions 110b, or the first body attaching portions 120b are shorter than distances to a center (a centroid in a plan view) of the subframe 100. Thus, the overlapping connecting portions V can be brought closer to the first lower arm support portions 131 (or the second lower arm support portions 132), the second body attaching portions 110b, or the first body attaching portions 120b, which require rigidity and strength.

(Base Member)

As shown in FIGS. 1 to 3 and FIGS. 6 to 11, the base member 110 has a flat shape that is shorter in the Z direction than in the X direction when viewed in the vehicle width direction (Y direction) and has an elongated shape that is longer in the Y direction than in the X direction when viewed in the vertical direction (Z direction). The base member 110 has a line-symmetrical shape in the vehicle width direction (with the axis of symmetry in the X direction serving as the center).

The base member 110 is formed by plastic working such as press molding of a plate material having a substantially uniform plate thickness. The base member 110 is made of a steel having a tensile strength of at least 590 MPa, for example. The tensile strength of the base member 110 is preferably at least 980 MPa.

The base member 110 is formed by plastic working such as press molding using a plate material that is substantially homogeneous and has a predetermined plate thickness (for example, 2.9 mm) as a base.

The base member 110 includes the base surface portion 111 having a surface facing the vehicle body 1 and the wall portions 112 extending downward from peripheral edges of the base surface portion 111, and has a substantially U-shaped cross-section (see FIG. 11). Thus, the base member 110 ensuring high rigidity can be formed from a single plate material.

In a state in which the base member 110 overlaps both a portion of the left bracket 120L and a portion of the right bracket 120R from above and is bridged between the left bracket 120L and the right bracket 120R, it is joined to left bracket 120L and right bracket 120R.

The base surface portion 111 extends planarly along a horizontal plane (XY plane). The wall portion 112 extends downward (in the Z direction) from a front end portion of the base surface portion 111.

The base surface portion 111 may appropriately have recessed portions 111k recessed upward or downward. Thus, rigidity of the base surface portion 111 can be increased.

The base member 110 may have a torque rod support portion 150 that supports a torque rod (not shown). Specifically, the base member 110 has the torque rod support portion 150 that appropriately supports the torque rod at a front portion substantially in the center of the base surface portion 111. The torque rod support portion 150 may be a hole provided at the front portion substantially in the center of the base surface portion 111. The torque rod support portion 150 provided in the base surface portion 111 supports the torque rod in cooperation with a torque rod support portion 150 provided in a torque rod support bracket 140 via appropriate bearings (not shown).

The base member 110 may appropriately have an attaching portion for stabilizer 115 including a hole for attaching a stabilizer (not shown).

The base member 110 may appropriately have an attaching portion for steering rack case 116 including a hole for mounting a steering rack case (not shown).

The wall portions 112 have the first lower arm support portions 131 and the second lower arm support portions 132 on rear and front sides of each of left end and right end portions thereof. Thus, the lower arms 210 can be supported in cooperation with the first lower arm support portions 131 and the second lower arm support portions 132 provided on the brackets 120.

The wall portions 112 have the second body attaching portions 110b at the left and right end portions of the rear wall portion 112 (first wall portion 112r). The second body attaching portions 110b are provided to extend rearward (in the X direction) from lower end portions of the left and right end portions of the rear wall portion 112 (first wall portion 112r). The second body attaching portions 110b may be provided integrally with the wall portions 112 or may be provided by joining separate members to the wall portions 112. The second body attaching portions 110b may be formed integrally with the rear wall portion 112 when the base member 110 is subjected to plastic working such as press molding.

The wall portions 112 may appropriately have an opening portion 112p in a center of the front wall portion 112 (second wall portion 112f) through which the torque rod constituting an engine mount is passed.

The subframe 100 may include inward flanges 113 adjacent to the wall portions 112 and facing the base surface portion 111. Thus, the moment of inertia of area of the subframe 100 is increased, and deformation such as bending of the subframe 100 with the vehicle length direction as an axis can be inhibited. As a result, deformation in the vehicle width direction in which the lower arms 210 are attached can be inhibited.

In detail, the wall portions 112 may have the inward flanges 113 extending from lower end portions of the wall portions 112 in the vehicle length direction (X direction) of the vehicle body 1. Specifically, the base member 110 may have an inward flange 113 extending rearward (in the X direction) from a lower end portion of the front wall portion 112. Similarly, the base member 110 may have an inward flange 113 extending forward (in the X direction) from a lower end of the rear wall portion 112.

The inward flanges 113 extend from the lower end portions of the wall portions 112 in the X direction with a length of, for example, about 10 mm. The inward flanges 113 are provided at the lower end portions of the wall portions 112 in the Y direction from left end portions to right end portions of the wall portions 112. Thus, bending rigidity and torsion rigidity of the subframe 100 can be mainly increased.

The subframe 100 may have the torque rod support bracket 140 provided to extend from the first wall portion 112r to the second wall portion 112f to form a hollow portion between itself and the base member 110. The torque rod support bracket 140 has the torque rod support portion 150 that supports the torque rod in cooperation with the torque rod support portion 150 of the base surface portion 111. Thus, rigidity of the torque rod support portion 150 can be increased, and rigidity of the entire subframe 100 can be increased.

The base member 110 is formed to bend at transition portions from the base surface portion 111 to the wall portions 112 and transition portions from the wall portions 112 to the inward flanges 113. In addition, a space is formed between the first wall portion 112r and the second wall portion 112f that are separated from each other. Further, a space is formed between a rear end of the front inward flange 113 and a front end of the rear inward flange that are separated from each other. In this way, since the base member 110 has the opened cross-section formed by the base surface portion 111, the wall portions 112, and the appropriate inward flanges 113, its rigidity can be ensured, and it can be formed from a single plate material by plastic working such as press molding without requiring joining means such as spot welding or arc welding.

(Bracket)

The brackets 120 are formed by plastic working such as press molding of a plate material having a substantially uniform plate thickness. The brackets 120 have the left bracket 120L and the right bracket 120R. The left bracket 120L is joined to a left end portion of the base member 110 by appropriate joining means such as spot welding. The right bracket 120R is joined to a right end portion of the base member 110 by appropriate joining means such as spot welding. The left bracket 120L and the right bracket 120R have a line-symmetrical shape in the vehicle width direction (with the axis of symmetry in the Z direction serving as a center).

The brackets 120 may be described below with the left bracket 120L exemplified as a representative.

As shown in FIG. 5, the left bracket 120L (bracket 120) may include a second member 122 and a third member 123.

Here, the second member 122 has the first body attaching portion 120b at its top portion. The second member 122 is joined to the bottom wall portion 121g of the first member 121, the side wall portion 121s of the first member 121, and the base surface portion 111 of the base member 110.

Thus, the side wall portion 121s forming an end portion of the subframe 100 in the vehicle width direction, which has high rigidity and is less likely to be deformed, can be caused to contribute to rigidity of the first body attaching portion 120b. In addition, by joining the second member 122 to the side wall portion 121s of the first member 121, the side wall portion 121s forming the end portion of the subframe 100 in the vehicle width direction, which has high rigidity and is less likely to be deformed, can be caused to contribute to the rigidity of the first body attaching portion 120b.

The second lower arm support portion 132 may be formed by the wall portion 112 and the second member 122.

Thus, the wall portion 112 with high rigidity and the side wall portion 121s of the first member 121 joined to the second member 122 can be caused to contribute to rigidity of the second lower arm support portion 132.

The first member 121 has a second lower arm support wall 121a. The second lower arm support wall 121a may be adjacent to the side wall portion 121s and overlapped on and joined to the wall portion 112 (second wall portion 112f).

Thus, since the second lower arm support wall 121a is restrained by the side wall portion 121s, the rigidity of the second lower arm support portion 132 can be improved.

The top wall portion 121t may be overlapped on and joined to the base surface portion 111.

Thus, the side wall portion 121s is less likely to be deformed than when the side wall portion 121s is made to abut the base surface portion 111 and fillet welded. Also, in terms of rust prevention and an implementation cost, face-to-face joining is more advantageous as compared to fillet welding. In addition, the joining performed by overlapping surfaces does not have to be joining of the entire surfaces and may be point joining. As the point joining, welding such as spot welding and laser welding, and fastening such as screwing and riveting can be exemplified.

As shown in FIG. 5, the top wall portion 121t and the second member 122 may be overlapped on and joined to each other.

Thus, deformation of the second member 122 can be inhibited.

As shown in FIG. 2, the base surface portion 111 and the second member 122 may be overlapped on and joined to each other.

Thus, deformation of the second member 122 can be inhibited.

Also, as shown in FIG. 5, the left bracket 120L (bracket 120) includes the first member 121 that has an opened cross-section and includes the left lower arm support portions 131L and 132L (the first lower arm support portion 131 and the second lower arm support portion 132), the second member 122 that is joined to the first member 121, has an opened cross-section, and includes a left lower arm support portion 132L and the first body attaching portion 120b, and the third member 123 that is joined to the second member 122, has an opened cross-section, and includes a lower arm support portion.

Thus, even if the bracket 120 has a complicated structure, it can be manufactured by joining a plurality of members in an overlapped state, which are formed by plastic working such as press molding of a plate material having a substantially uniform plate thickness. In addition, since plates can be overlapped at portions of the bracket 120 that require rigidity (for example, the left lower arm support portions 131L and 132L and the first body attaching portion 120b), rigidity and strength of portions that require them can be increased.

The first member 121, the second member 122, and the third member 123 are formed by plastic working such as press molding from a plate material having a substantially uniform plate thickness. The first member 121, the second member 122, and the third member 123 are joined together by appropriate joining means s (locations indicated by circular broken lines in FIG. 5) such as spot welding.

The first member 121 has the bottom wall portion 121g whose exposed upper surface faces the vehicle body 1 and the side wall portion 121s extending upward from the bottom wall portion 121g toward the base member 110. In this way, the upper surface of the bottom wall portion 121g is exposed to face the vehicle body 1, and a cross-section of the subframe 100 perpendicular to the vehicle width direction (Y direction) can be made to be an opened cross-section. Accordingly, the weight of the subframe 100 can be reduced. Also, the first member 121 can be formed from a sheet of plate material by plastic working such as press molding.

Also, the upper surface of the bottom wall portion 121g is preferably separated from a lower surface of the base surface portion 111 of the base member 110 (see FIG. 8). The upper surface of the bottom wall portion 121g is separated from the lower surface of the base surface portion 111 of the base member 110, and thus, in particular, rigidity with respect to bending about the Z direction and the Y direction can be increased.

Further, since the first member 121 has the side wall portion 121s that is formed by bending from an end portion of the bottom wall portion 121g, it is possible to increase rigidity particularly against bending about the Z direction. Since the first member 121 has the side wall portion 121s, a load generated between the first body attaching portion 120b, the first lower arm support portion 131, and the second lower arm support portion 132 can be received in a plate surface direction and can be efficiently resisted. Accordingly, the subframe 100 can be formed to ensure required rigidity and strength, and at the same time, can be made lightweight.

The second member 122 has the second lower arm support portion 132 and the first body attaching portion 120b. The second member 122 is joined by joining means s, such as spot welding, in a state in which it partially overlaps the first member 121. The second lower arm support portion 132 provided on the second member 122 supports the lower arm 210 in cooperation with the second lower arm support portion 132 provided on the first member 121.

The third member 123 is joined by joining means s, such as spot welding, in a state in which it partially overlaps the second member 122. The third member 123 may have the second lower arm support portion 132. The second lower arm support portion 132 of the third member 123 and the second lower arm support portion 132 of the second member 122 overlap each other. Thus, the rigidity and strength of the second lower arm support portion 132 can be increased. Also, the third member 123 is joined to the second member 122 to form a closed space between itself and the second member 122. A cross-section perpendicular to the Z direction formed by the second member 122 and the third member 123 is a closed cross-section. Thus, rigidity and strength near the first body attaching portion 120b can be increased.

(Torque Rod Support Bracket)

The torque rod support bracket 140 is formed by plastic working such as press molding of a plate material having a substantially uniform plate thickness. As shown in FIG. 4, the torque rod support bracket 140 includes a bridging portion 145 that extends in the X direction from a first end portion 141 toward a second end portion 142 and a connecting portion 146 that is integrated with the bridging portion 145 and extends leftward and rightward in the Y direction. The torque rod support bracket 140 is generally T-shaped as a whole. The torque rod support bracket 140 has an opened cross-section as a whole. The first end portion 141 of the torque rod support bracket 140 is joined to the first wall portion 112r or the inward flange 113 of the base member 110 by joining means s such as spot welding. Also, the connecting portion 146 at the second end portion 142 of the torque rod support bracket 140 is joined to the second wall portion 112f or the inward flange 113 of the base member 110 by joining means s such as spot welding. The torque rod support bracket 140 has the torque rod support portion 150.

(Method for Manufacturing Subframe)

Next, a method for manufacturing the subframe 100 will be described.

(1) First, the base member 110 is manufactured.

Specifically, a plate material that is substantially homogeneous and has a predetermined thickness (for example, 2.9 mm) is prepared. Next, the base member 110 having a substantially U-shaped cross-section, in which the base surface portion 111, the wall portions 112, and the appropriate inward flanges 113 are formed, is formed by press molding.

(2) The brackets 120 are manufactured (a bracket manufacturing step).

Specifically, each of the first members 121, the second members 122, and the third members 123, as shown in FIG. 5, which constitute the brackets 120, is formed by press molding from a plate material that is each substantially homogeneous and has a predetermined plate thickness (for example, 3.6 mm). Then, they are overlapped on and joined to each other by spot welding. Then, the left bracket 120L and the right bracket 120R formed in this way, which have a line-symmetrical relationship with each other, are prepared.

(3) Then, the base member 110 and the brackets 120 are welded by spot welding and fastening members such as bolts. Specifically, the base member 110 is in a state in which it is bridged between the left bracket 120L and the right bracket 120R. Then, locations at which the base member, the left bracket 120L, and the right bracket 120R overlap each other are fastened with the fastening members and joined by spot welding. In this way, the subframe 100 can be manufactured. Accordingly, it is possible to provide the subframe 100 in which a manufacturing cost associated with welding can be reduced.

OTHER EMBODIMENTS

Although one embodiment has been described in detail above with reference to the drawings, a specific configuration is not limited to the one described above, and various changes in design can be made.

The subframe 100 according to the present embodiment includes the base member 110 and the first member 121. The base member 110 is a channel-shaped member that includes the base surface portion 111 and the two wall portions 112 on both sides of the base surface portion 111 in the vehicle length direction and is open on its lower side in the vehicle height direction. The first member 121 includes the bottom wall portion 121g, the top wall portion 121t, and the side wall portion 121s. The bottom wall portion 121g and the top wall portion 121t are disposed in the same direction as the base surface portion 111. The top wall portion 121t is overlapped on and joined to the base surface portion 111. The wall portions 112 and the bottom wall portion 121g form the channel shape. The side wall portion 121s is a wall that blocks the vehicle width direction between the bottom wall portion 121g and the top wall portion 121t. The first lower arm support portion 131 is formed by the base surface portion 111 and the bottom wall portion 121g. Thus, since there is no closing plate over the entire width in the vehicle width direction, the subframe 100 can be lightened. Further, since the side wall portion 121s is provided adjacent to the first lower arm support portion 131 and the side wall portion 121s is fixed to the base member 110 via the top wall portion 121t, the first lower arm support portion 131 is less likely to be deformed. In addition, since the side wall portion 121s restrains the base member 110 and the bottom wall portion 121g, the end portion of the subframe 100 in the vehicle width direction is less likely to be deformed. Accordingly, both the weight reduction of the subframe 100 and the performance of the first lower arm support portion 131 can be achieved.

BRIEF DESCRIPTION OF THE REFERENCE SYMBOLS

1 Vehicle body
100 Subframe
110 Base member
110b Second body attaching portion
111 Base surface portion
111k Recessed portion
112 Wall portion
112f Second wall portion
112p Opening portion
112r First wall portion
113 Inward flange
115 Attaching portion for stabilizer
116 Attaching portion for steering rack case
120 Bracket
120b First body attaching portion
120L Left bracket
120R Right bracket
121 First member
121a Second lower arm support wall
121g Bottom wall portion
121s Side wall portion
121t Top wall portion
122 Second member
123 Third member
131 First lower arm support portion
131L Left lower arm support portion
131R Right lower arm support portion
132 Second lower arm support portion
132L Left lower arm support portion.
132R Right lower arm support portion 140 Torque rod support bracket
141 First end portion
142 Second end portion
145 Bridging portion
146 Connecting portion
150 Torque rod support portion
200 Suspension
210 Lower arm
210L Left lower arm
210R Right lower arm
s Joining means
V Overlapping connecting portion

What is claimed is:

1. A subframe comprising a base member and a first member,
   wherein the base member is a channel-shaped member that includes a base surface portion and two wall portions on both sides of the base surface portion in a vehicle length direction and is open on a lower side of the base member in a vehicle height direction,
   the first member includes a bottom wall portion, a top wall portion, and a side wall portion,
   the bottom wall portion and the top wall portion are disposed in an order along the same direction as the base surface portion,
   the top wall portion is overlapped on and joined to the base surface portion,
   the wall portions and the bottom wall portion form the channel shape,
   the side wall portion is a wall that blocks a vehicle width direction between the bottom wall portion and the top wall portion, and
   a first lower arm support portion is formed by the base surface portion and the bottom wall portion.

2. The subframe according to claim 1, further comprising a bracket,
   wherein the bracket includes a second member and a third member, and
   the second member includes a first body attaching portion at a top portion of the second member and is joined to the bottom wall portion, the side wall portion, and the base surface portion.

3. The subframe according to claim 2, wherein a second lower arm support portion is formed by one of the two wall portions and the second member.

4. The subframe according to claim 2, wherein the top wall portion and the second member are overlapped on and joined to each other.

5. The subframe according to claim 2, wherein the base surface portion and the second member are overlapped on and joined to each other.

6. The subframe according to claim 1,
   wherein the first member includes a second lower arm support wall, and
   the second lower arm support wall is adjacent to the side wall portion and is overlapped on and joined to one of the two wall portions.

7. The subframe according to claim 1, wherein the base member includes a second body attaching portion oriented in the same direction as the base surface portion at an end portion of the base member in the vehicle width direction from the side wall portion.

8. The subframe according to claim 1, wherein the top wall portion is overlapped on and joined to the base surface portion.

9. The subframe according to claim 1, further comprising inward flanges that are adjacent to the wall portions and face the base surface portion.

* * * * *